US011188684B2

(12) United States Patent
Budde et al.

(10) Patent No.: US 11,188,684 B2
(45) Date of Patent: Nov. 30, 2021

(54) SOFTWARE DEFINED SUBSYSTEM CREATION FOR HETEROGENEOUS INTEGRATED CIRCUITS

(71) Applicant: XILINX, INC., San Jose, CA (US)

(72) Inventors: Gangadhar Budde, Hyderabad (IN); Shreegopal S. Agrawal, Hyderabad (IN); Siddharth Rele, Navi Mumbai (IN); Subhojit Deb, Sodepur (IN)

(73) Assignee: Xilinx, Inc., San Jose, CA (US)

( * ) Notice: Subject to any disclaimer, the term of this patent is extended or adjusted under 35 U.S.C. 154(b) by 104 days.

(21) Appl. No.: 16/686,070

(22) Filed: Nov. 15, 2019

(65) Prior Publication Data

US 2021/0150072 A1    May 20, 2021

(51) Int. Cl.
*G06F 21/76* (2013.01)
(52) U.S. Cl.
CPC .................................. *G06F 21/76* (2013.01)
(58) Field of Classification Search
CPC .......... G06F 15/00; G06F 13/00; G06F 12/00; G06F 15/76; G06F 13/40; G06F 15/78; G06F 9/40; G06F 9/44; G06F 3/14; G06F 21/76; G08G 5/00; G09G 5/36
See application file for complete search history.

(56) References Cited

U.S. PATENT DOCUMENTS

| | | | | |
|---|---|---|---|---|
| 6,088,046 A * | 7/2000 | Larson | ................... | G09G 5/363 |
| | | | | 345/538 |
| 7,526,597 B2 * | 4/2009 | Perego | ................ | G06F 13/1684 |
| | | | | 711/105 |
| 9,164,952 B2 * | 10/2015 | Master | ................ | G06F 13/4027 |
| 9,213,866 B1 | 12/2015 | Sagheer et al. | | |
| 10,176,131 B1 | 1/2019 | Ygal | | |
| 10,289,785 B1 | 5/2019 | Panou | | |
| 2005/0177377 A1 * | 8/2005 | Wright | ...................... | G06F 8/20 |
| | | | | 717/104 |
| 2011/0145934 A1 | 6/2011 | Miron | | |

(Continued)

FOREIGN PATENT DOCUMENTS

WO    2016/077393 A1    5/2016

OTHER PUBLICATIONS

U.S. Appl. No. 16/367,108, filed Mar. 27, 2019, San Jose, CA USA.

(Continued)

*Primary Examiner* — Thanhnga B Truong
(74) *Attorney, Agent, or Firm* — Kevin T. Cuenot

(57) ABSTRACT

Creation of subsystems for a user design to be implemented in an integrated circuit (IC) includes generating, using computer hardware, a subsystem topology based on user provided subsystem data, wherein the subsystem topology specifies a plurality of subsystems of the user design where each subsystem includes a master circuit, and determining, using the computer hardware, a system management identifier for each master circuit of the subsystem topology. Programming data for programmable protection circuits of the IC can be automatically generated using the computer hardware based on the subsystem topology and system management identifiers. The programmable protection circuits, when programmed with the programming data, form the plurality of subsystems and physically isolate the plurality of subsystems on the integrated circuit from one another.

20 Claims, 7 Drawing Sheets

(56) References Cited

U.S. PATENT DOCUMENTS

2013/0311796 A1    11/2013   Brinks et al.
2019/0238453 A1     8/2019   Swarbrick
2019/0324806 A1    10/2019   Somdutt et al.

OTHER PUBLICATIONS

U.S. Appl. No. 15/956,480, filed Apr. 18, 2018, San Jose, CA USA.
U.S. Appl. No. 15/266,963, filed Sep. 15, 2016, San Jose, CA USA.
Xilinx, Inc., Sanders, L., "Isolation Methods in Zynq UltraScale+ MPSoCs,", XApp1320 (v1.0), Jul. 26, 2017, 41 pages, San Jose, CA USA.

* cited by examiner

506

| Name | Start Address | Size | Unit | TZ Settings | Access Settings | End Address | Type |
|---|---|---|---|---|---|---|---|
| ∨ APU Subsystem | | | | | | | |
| ∨ Masters | | | | | | | |
| ∨ APU | | | | | | | |
| ∨ Slaves | | | | | | | |
| ∨ Memory | | | | | | | |
| ∨ DDR | 0x0 | 1 | MB ∨ | NonSecure ∨ | Read/Write ∨ | 0xFFFFF | DDR |
| ∨ Peripherals | | | | | | | |
| ∨ CAN1 | 0xFF070000 | 64 | KB ∨ | NonSecure ∨ | Read/Write ∨ | 0xFF07FFFF | LPD |
| ∨ RPU Subsystem | | | | | | | |
| ∨ Masters | | | | | | | |
| ∨ RPU0 | | | | Secure ∨ | | | |
| ∨ Slaves | | | | | | | |
| ∨ Memory | | | | | | | |
| ∨ DDR | 0x100000 | 1 | MB ∨ | NonSecure ∨ | Read/Write ∨ | 0x1FFFFF | DDR |
| ∨ Peripherals | | | | | | | |
| ∨ UART0 | 0xFF000000 | 64 | KB ∨ | NonSecure ∨ | Read/Write ∨ | 0xFF00FFFF | LPD |

FIG. 6

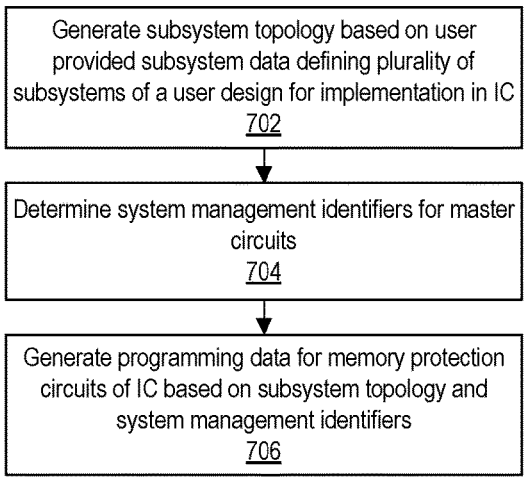

FIG. 7

SOFTWARE DEFINED SUBSYSTEM CREATION FOR HETEROGENEOUS INTEGRATED CIRCUITS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to creating subsystems within heterogeneous ICs.

BACKGROUND

The complexity of ICs continues to increase. Currently available ICs provide entire systems on a chip. These ICs include a variety of different components capable of operating in a cooperative manner. As an example, an IC may include programmable logic coupled to one or more hardwired processors. This means that the IC may include a mix of hardwired and "soft" circuit blocks operating as masters and slaves. As the complexity of ICs continues to increase, the risk that one component of the IC will interfere with the operation of another component also increases. For example, one component operating as a master in the IC may access memory intended for use by another, different component also operating as a master in the IC. This situation may pose a significant risk from a design and/or safety point of view particularly when isolation between the masters and slaves is desired.

SUMMARY

In one aspect, a method can include generating, using computer hardware, a subsystem topology based on user provided subsystem data. The subsystem topology specifies a plurality of subsystems of a user design for implementation in an IC where each subsystem includes a master circuit. The method can include determining, using the computer hardware, a system management identifier for each master circuit of the subsystem topology and automatically generating, using the computer hardware, programming data for programmable protection circuits of the IC based on the subsystem topology and system management identifiers. The programmable protection circuits, when programmed with the programming data, are capable of forming the plurality of subsystems and physically isolating the plurality of subsystems on the IC from one another.

In another aspect, a system includes a processor configured to initiate operations. The operations can include generating a subsystem topology based on user provided subsystem data. The subsystem topology specifies a plurality of subsystems of a user design for implementation in an IC where each subsystem includes a master circuit. The operations can include determining a system management identifier for each master circuit of the subsystem topology and automatically generating programming data for programmable protection circuits of the IC based on the subsystem topology and system management identifiers. The programmable protection circuits, when programmed with the programming data, are capable of forming the plurality of subsystems and physically isolating the plurality of subsystems on the IC from one another.

In another aspect, a computer program product includes a computer readable storage medium having program code stored thereon. The program code is executable by a processor to perform operations. The operations can include generating a subsystem topology based on user provided subsystem data. The subsystem topology specifies a plurality of subsystems of a user design for implementation in an IC where each subsystem includes a master circuit. The operations can include determining a system management identifier for each master circuit of the subsystem topology and automatically generating programming data for programmable protection circuits of the IC based on the subsystem topology and system management identifiers. The programmable protection circuits, when programmed with the programming data, are capable of forming the plurality of subsystems and physically isolating the plurality of subsystems on the IC from one another.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 6 illustrates an example implementation of an isolation configuration graphical user interface.

FIG. 7 illustrates an example method of creating subsystems for a user design.

DETAILED DESCRIPTION

Figure 1:
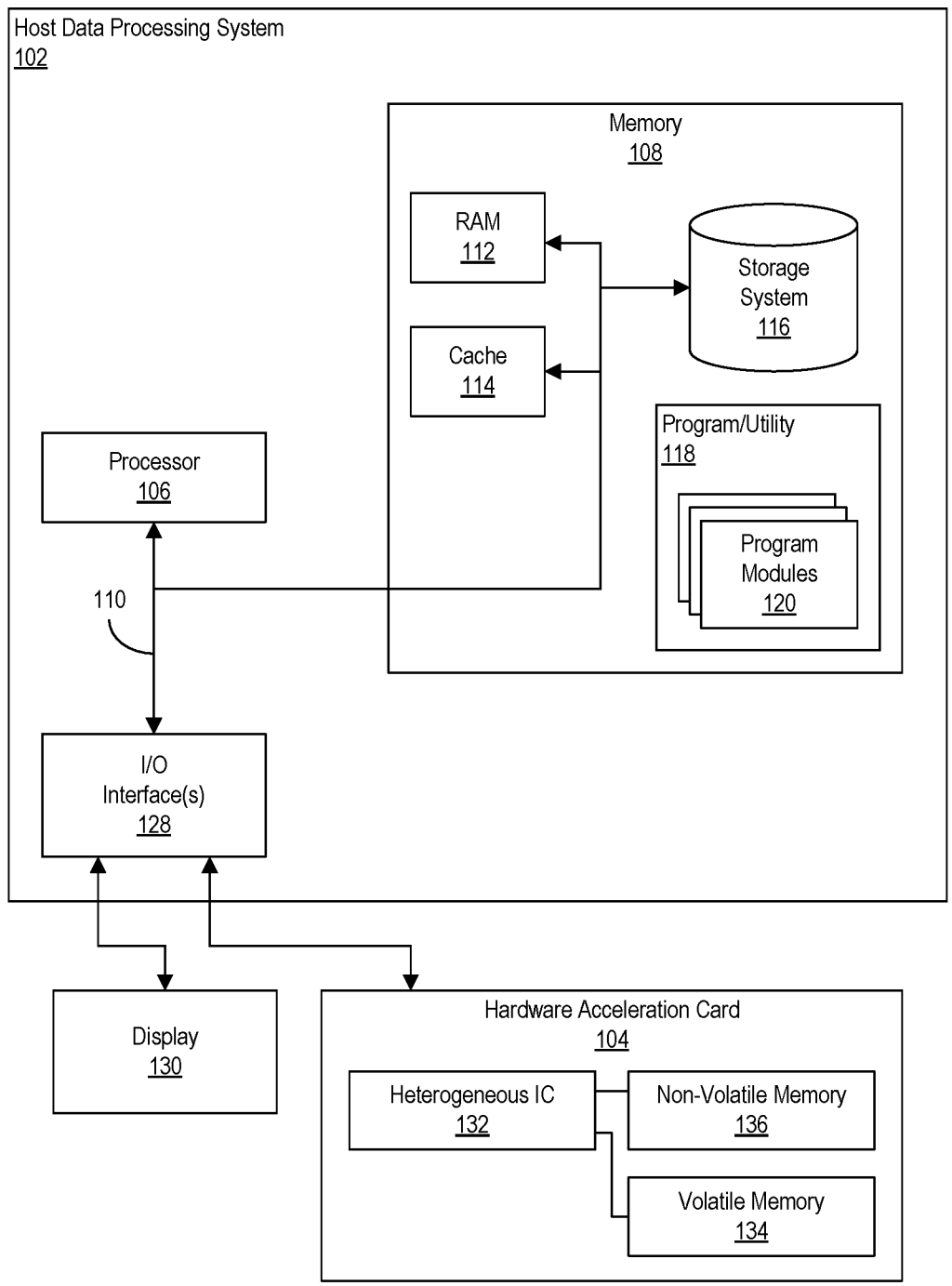
FIG. 1 illustrates an example computing environment for use with the inventive arrangements described within this disclosure.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to creating subsystems within heterogeneous ICs. The heterogeneous ICs may be used to implement embedded systems for any of a variety of different applications. In accordance with the inventive arrangements described within this disclosure, a design may be created for implementation in an IC where the design includes multiple different subsystems. The subsystems, or portions thereof, may be physically isolated from the other. One aspect of defining subsystems and providing isolation is memory protection. Memory protection ensures that entities within the IC are only able to access the memories that are intended in the design thereby avoiding the case wherein one circuit accesses the memory allocated to another circuit.

Conventional processing systems (e.g., computer-based systems with processors that execute instructions) rely on a memory management unit (MMU) for memory protection and management. While an MMU may provide satisfactory protection within a computer-based system or a system in which the master may only be a processor, this mechanism is not reliable for safety critical applications or for more heterogeneous ICs. An MMU, for example, may be unable to prevent illegal access to memory from malicious or buggy system software that may be executing on a non-secure master processor. As an example, an MMU may not be able to prevent illegal memory accesses by a master circuit implemented in programmable logic such as a soft processor or a direct memory access (DMA) circuit implemented in programmable logic.

In one aspect, programmable protection circuits (PPCs) may be provided within an IC architecture. The PPCs are capable of protecting certain slave circuits such as memories from access by unauthorized master circuits. The PPCs provide permission checking for accesses to slave circuits to prevent one master from accessing the slave circuits (e.g., the memory or memory space space) of another master circuit. The PPCs are capable of providing robust protection and are well-suited for protecting portions of memory dedicated for safety applications. While PPCs have been used, their application has been limited to working with hardwired processors.

The inventive arrangements provide a software-driven technique for creating subsystems for a user design. In the case of a heterogeneous IC that includes hardwired and soft programmable resources, defining subsystems and isolation is a complex task. Within a heterogeneous IC, the architecture is no longer processor-centric. It follows that processor-centric approaches for memory protection are sub-optimal or do not work. With a heterogeneous IC, a user design may utilize hard circuit blocks and soft circuit blocks spread throughout the IC. Soft circuit blocks refer to circuit blocks implemented in programmable logic. The circuit blocks may be connected using a variety of technologies including a network-on-chip (NoC). The example implementations described herein address the limitations of memory protection of process-centric ICs and make resources, e.g., all resources, of the IC available to the user for purposes of subsystem creation.

In one aspect, the use of PPCs may be expanded to encompass master circuits implemented in programmable logic. Master circuits implemented in programmable logic may also be referred to herein as "soft masters." In accordance with the inventive arrangements described within this disclosure, users are capable of defining subsystems for heterogeneous ICs. For each subsystem, the user may define the master circuits and slave circuits that are members of each subsystem. The master circuits may include so called soft masters. Further, the user may define isolation among the subsystems by defining slave circuit isolation.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example computing environment 100 for use with the inventive arrangements described within this disclosure. Computing environment 100 includes a host data processing system (host system) 102 coupled to a hardware acceleration card 104. The components of host system 102 may include, but are not limited to, one or more processors 106 (e.g., central processing units), a memory 108, and a bus 110 that couples various system components including memory 108 to processor(s) 106. Processor(s) 106 may include any of a variety of processors that are capable of executing program code. Example processor types include, but are not limited to, processors having an x86 type of architecture (IA-32, IA-64, etc.), Power Architecture, ARM processors, and the like.

Bus 110 represents one or more of any of several types of communication bus structures, including a memory bus or memory controller, a peripheral bus, an accelerated graphics port, and a processor or local bus using any of a variety of available bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Host system 102 typically includes a variety of computer readable media. Such media may be any available media that is accessible by host system 102 and may include any combination of volatile media, non-volatile media, removable media, and/or non-removable media.

Memory 108 may include computer readable media in the form of volatile memory, such as random-access memory (RAM) 112 and/or cache memory 114. Host system 102 may also include other removable/non-removable, volatile/non-volatile computer system storage media. By way of example, storage system 116 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 110 by one or more data media interfaces. As will be further depicted and described below, memory 108 may include at least one computer program product having a set (e.g., at least one) of program modules (e.g., program code) that are configured to carry out the functions and/or operations described within this disclosure.

For example, program/utility 118, having a set (at least one) of program modules 120 which may include, but are not limited to, an operating system, one or more application programs (e.g., user applications), other program modules, and/or program data, is stored in memory 108. Program modules 120 generally carry out the functions and/or methodologies as described herein at least with respect to operations performed by host system 102. For example, program modules 120 may implement a software stack. The software stack may implement a runtime environment capable of performing the host system 102 operations described herein. In one aspect, program modules 120 includes a driver or daemon capable of communicating with programmable IC 132.

Program/utility 118 is executable by processor(s) 106. Program/utility 118 and any data items used, generated, and/or operated upon by processor(s) 106 are functional data structures that impart functionality when employed by processor(s) 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Host system 102 may include one or more Input/Output (I/O) interfaces 128 communicatively linked to bus 110. I/O interface(s) 128 allow host system 102 to communicate with external devices, couple to external devices that allow user(s) to interact with host system 102, couple to external devices that allow host system 102 to communicate with other computing devices, and the like. For example, host system 102 may be communicatively linked to a display 130 and to hardware acceleration card 104 through I/O interface(s) 128. Host system 102 may be coupled to other external devices such as a keyboard (not shown) via I/O interface(s) 128. Examples of I/O interfaces 128 may include, but are not limited to, network cards, modems, network adapters, hardware controllers, etc.

In an example implementation, the I/O interface 128 through which host system 102 communicates with hardware acceleration card 104 is a PCIe adapter. Hardware acceleration card 104 may be implemented as a circuit board that couples to host system 102. Hardware acceleration card 104 may, for example, be inserted into a card slot, e.g., an available bus and/or PCIe slot, of host system 102.

Hardware acceleration card 104 includes programmable IC 132. Hardware acceleration card 104 also includes volatile memory 134 coupled to programmable IC 132 and a non-volatile memory 136 also coupled to programmable IC 132. Volatile memory 134 may be implemented as a RAM that is external to programmable IC 132, but is still considered a "local memory" of programmable IC 132, whereas memory 108, being within host system 102, is not considered local to programmable IC 132. In some implementations, volatile memory 134 may include multiple gigabytes of RAM. Non-volatile memory 136 may be implemented as flash memory. Non-volatile memory 136 is also external to programmable IC 132 (e.g., is off-chip) and may be considered local to programmable IC 132.

FIG. 1 is not intended to suggest any limitation as to the scope of use or functionality of the examples described herein. Host system 102 is an example of computer hardware (e.g., a system) that is capable of performing the various operations described within this disclosure relating to hardware acceleration card 104 and/or programmable IC 132.

Host system 102 is only one example implementation of a computer that may be used with hardware acceleration card 104. Host system 102 is shown in the form of a computing device, e.g., a computer or server. Host system 102 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

Host system 102 is also an example implementation of an Electronic Design Automation (EDA) system. Program modules 120, for example, may include EDA software capable of performing the operations described herein in terms of subsystem creation, performing a design flow, (e.g., synthesis, placement, routing, and/or bitstream generation), generating a device image, and the like with regard to a user design. As such, host system 102 serves as an example of an EDA system capable of processing user designs and/or performing the various operations attributed to a computing system described herein.

Figure 2:
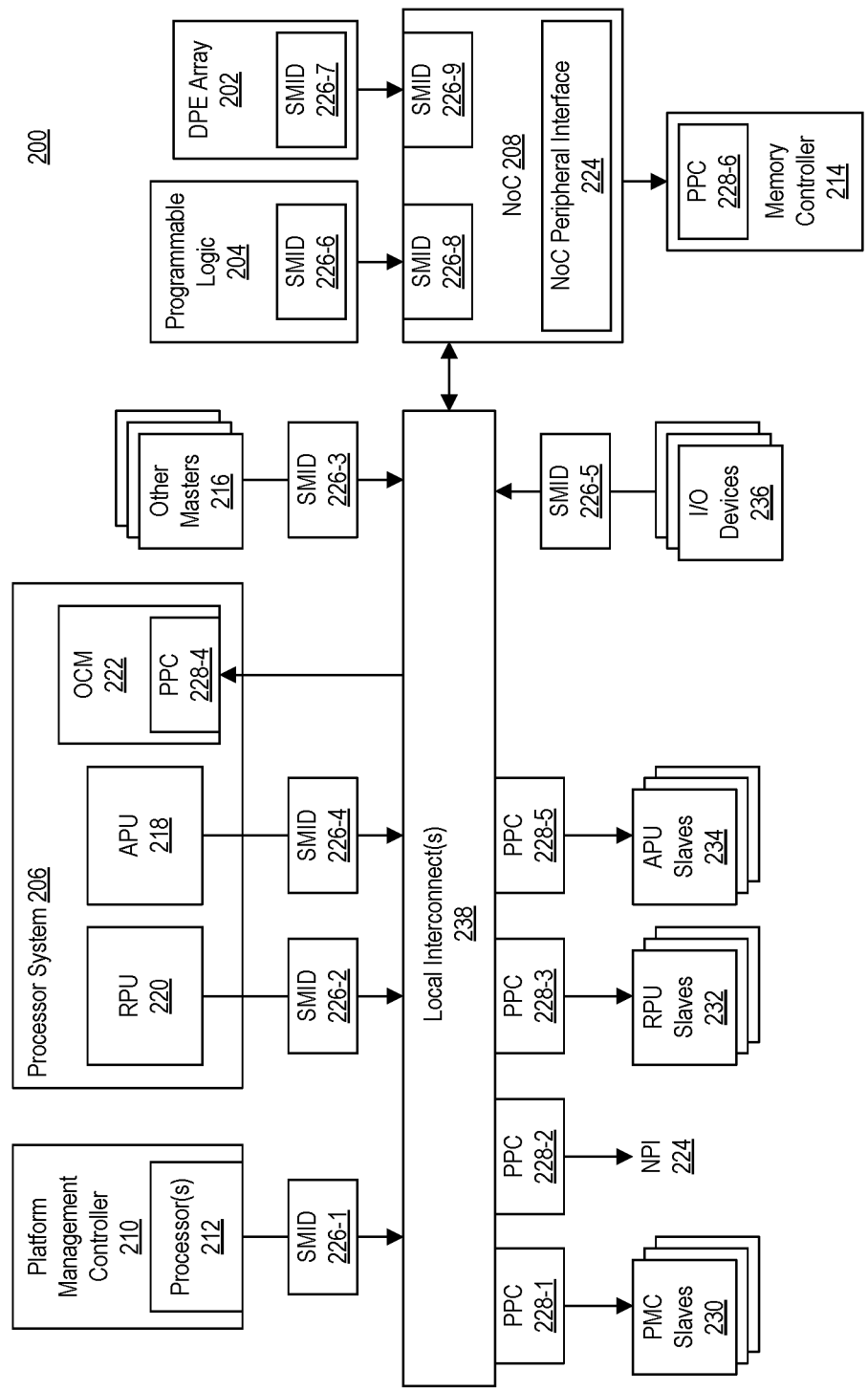
FIG. 2 illustrates an example architecture for the programmable integrated circuit (IC) of FIG. 1.

FIG. 2 illustrates an example architecture 200 for programmable IC 132 of FIG. 1. Architecture 200 is illustrative of a heterogeneous IC in that architecture 200 includes a variety of different types of resources that may be used to implement a user design. The resources may include a variety of different hardwired circuit blocks, which may include programmable hardwired circuit blocks, and programmable logic.

In the example, architecture 200 includes a data processing engine (DPE) array 202, programmable logic (PL) 204, a processor system (PS) 206, a NoC 208, and a platform management controller (PMC) 210. Architecture 200 may include one or more hardwired circuit blocks such as memory controller 214. In the example, local interconnect(s) 238 connect PS 206, PMC 210, other masters 216, and NoC 208.

DPE array 202 is implemented as a plurality of interconnected and programmable DPEs. The DPEs of DPE array 202 may be hardwired. Each DPE within DPE array 202 can include a core connected to a memory. Each core is capable of executing program code. DPE array 202 is programmable in that the program code may be provided to each core. Further, connectivity of the DPEs in the DPE array is defined by configuration data loaded into configuration registers therein. Unlike circuit blocks within PL 204, DPEs within DPE array 202 may be connected by way of streaming switches and, in some cases, direct connections between cores of adjacent DPEs. DPEs, for example, may communicate using packetized data. DPE array 202 may be programmed to implement a plurality of clusters of DPEs that operate independently of one another. One cluster may be assigned to a first subsystem while a second and different subset of DPEs may be assigned to a different subsystem.

PL 204 is circuitry that may be programmed to perform specified functions. As an example, PL 204 may be implemented as field programmable gate array type of circuitry. PL 204 can include an array of programmable circuit blocks. Examples of programmable circuit blocks within PL 204 include, but are not limited to, configurable logic blocks (CLBs), block RAMs (BRAM and/or UltraRAM or URAM), and digital signal processing blocks (DSPs). Each programmable circuit block within PL 204 typically includes both programmable interconnect circuitry and a programable element. The programmable interconnect circuitry typically includes a large number of interconnect wires of varying lengths interconnected by programmable interconnect points (PIPs). Typically, the interconnect wires are configured (e.g., on a per wire basis) to provide connectivity on a per-bit basis (e.g., where each wire conveys a single bit of information). PL 204 is capable of implementing the logic of a user design using programmable elements that may include, for example, look-up tables, registers, arithmetic logic, and so forth. The programmable interconnect and programmable elements, collectively referred to as PL 204, may be programmed by loading configuration data into internal configuration memory cells that define how the programmable elements are configured and operate. As such, PL 204 is capable of implementing user-specified circuits.

PS 206 includes a plurality of hardwired processors and hardwired peripheral devices (not shown). Each of the processors of PS 206 is capable of executing instructions. For example, PS 206 can include an application processing unit (APU) 218 and a real-time processing unit (RPU) 220. PS 206 may include an on-chip memory (OCM) 222 that may be accessed by APU 218, RPU 220, and/or one or more other masters that have been provided access thereto, e.g., masters implemented in PL 204 or other hardwired circuit blocks acting as masters. Examples of the peripheral devices that may be included in PS 206 include, but are not limited to, Universal Serial Bus (USB) controller(s), Universal Asynchronous Receiver Transmitter(s) (UARTs), Controller Area Network(s) (CANs), and/or other I/O controllers.

NoC 208 is a programmable interconnecting network for sharing data between endpoint circuits in architecture 200. The endpoint circuits can be disposed in DPE array 202, PL 204, PS 206, and/or selected hardwired circuit blocks. NoC 208 can include high-speed data paths with dedicated switching. In an example, NoC 208 includes one or more horizontal paths, one or more vertical paths, or both horizontal and vertical path(s). Within NoC 208, the nets that are to be routed through NoC 208 are unknown until a user design is created for implementation within an IC using architecture 200. NoC 208 may be programmed by loading configuration data into internal configuration registers that define how elements within NoC 208 such as switches and interfaces are configured and operate to pass data from switch to switch and among the NoC interfaces to connect the endpoint circuits. NoC 208 is fabricated as part of architecture 200 (e.g., is hardwired) and, while not physically modifiable, may be programmed to establish connectivity between different master circuits and different slave circuits of a user circuit design. NoC 208, upon power-on, does not implement any data paths or routes therein. Once configured, e.g., by PMC 210, NoC 208 implements data paths or routes between endpoint circuits.

NoC 208 includes a NoC Peripheral Interface (NPI) 224. NPI 224 includes circuitry to program components within NoC 208 such as connection circuits to endpoint circuits (referred to as NoC master units and NoC slave units) and switches within NoC 208. For example, NPI 224 may be coupled to registers within NoC 208 that control the functionality thereof. Through NPI 224, PMC 210 may write configuration data to the registers of NoC 208 to control Quality of Service (QoS), error handling and reporting, transaction control, power management, and address mapping control. NPI 224 may also be used by PMC 210 to program one or more of hardwired circuit blocks such as memory controller 214.

Memory controller 214 is an example of a hardwired circuit block that may be accessed by master circuits to access portions of a RAM located off-chip, e.g., external to the IC implemented using architecture 200. For example, referring to FIG. 1, memory controller 214 may be used to access volatile memory 134. Architecture 200 may include additional hardwired circuit blocks not illustrated in FIG. 2. Examples of such hardwired circuit blocks include, but are not limited to, an analog-to-digital converter, a digital-to-analog converter, and/or a video codec.

PMC 210 is capable of configuring and managing the various resources (e.g., DPE array 202, PL 204, PS 206, and NoC 208) of architecture 200. PMC 210, for example, may include one or more ROMs (not shown), one or more RAMs (not shown), and one or more processors 212 capable of executing program code. In one aspect, the ROM stores boot program code that may be executed by one of the processors 212 in PMC 210 to retrieve firmware from a designated location to be stored in the RAM therein. The firmware, once stored in the RAM of PMC 210, may be executed by another one of processors 212. The ROM(s) and RAM(s) in PMC 210 may only be read and/or written by processors 212 in PMC 210 so that PMC 210 acts as a Root-of-Trust for architecture 200. PMC 210 controls the programmable resources of architecture 200 by executing the firmware loaded therein.

In the example, architecture 200 includes additional circuits that are capable of implementing security features. These additional circuits may be used to create different and independent subsystems (e.g., partitions) in architecture 200. These circuits are capable of firewalling one subsystem from another. As such, each subsystem, which has one or more master circuits and one or more slave circuits, may execute a design, e.g., a portion of a user design, therein. In the example of FIG. 2, the security circuits include a plurality of System Management Identifier (SMID) circuits 226 and a plurality of PPCs 228.

In the example of FIG. 2, PMC 210, APU 218, RPU 220, OCM 222, and other masters 216, are connected to local interconnects 238 via SMID circuits 226. Local interconnect 238 is connected to NoC 208. PL 204 and/or DPE array 202 are connected to NoC 208. In some cases, SMID circuits 226 are programmable to use a particular SMID. During configuration, PMC 210 is capable of assigning and writing an SMID to the configuration registers in different ones of SMID circuits 226. Other SMID circuits, e.g., SMID circuits 226-2 and 226-4, which correspond to certain hardwired circuit blocks in PS 206, may be implemented with a static, default SMIDs. These SMIDs may not be user editable.

In general, each master circuit in architecture 200, including soft masters, may be uniquely identified by an SMID. In some cases, master circuits may be assigned more than one SMID. Each SMID circuit 226 is capable of attaching or inserting the SMID of the corresponding master circuit into the transactions initiated by that master circuit. As such, each transaction originating from APU 218, for example, will include an SMID, inserted by SMID circuit 226-4, that uniquely identifies APU 218. Similarly, each transaction originating from RPU 220 will have an SMID, inserted by SMID 226-2, that uniquely identifies RPU 220. Each transaction initiated by a soft master implemented in PL 204 will include an SMID, inserted by SMID 226-6 and/or SMID 226-8, in the transaction that uniquely identifies the soft master. The SMID for the soft master may be user defined or assigned automatically. In this manner, the source of transactions exchanged between master circuits and slave circuits throughout architecture 200 may be uniquely identified by the particular SMID within that transaction.

PPCs 228 are capable of protecting access to slave circuits within architecture 200. Each of the PPCs 228 is capable of checking the particular SMID of each transaction entering the circuit block. Each of PPCs 228 is capable of checking whether the SMID of the transactions is an allowed SMID, e.g., on a list of allowed SMIDs maintained by the respective PPCs 228. Each of the PPCs 228 is also capable of checking that the address or address range to be accessed by a transaction is an address range for which the SMID is authorized to access. In this regard, PPCs 228 are capable of enforcing access privileges by ensuring that only authorized circuit blocks (based on SMID) are able to access other circuit blocks and further only access those address ranges for which the particular SMIDs are permitted.

In one aspect, PPCs 228 includes a first type that is configured to protect configuration registers of circuit blocks. Such PPCs 228 are capable of allowing only authorized SMIDs to access the configuration registers and only those particular configuration registers having an address specified on the list of allowed address(es) for the respective allowed SMID(s). Examples of such PPCs 228 include, but are not limited to, PPCs 228-1, 228-2, 228-3, and 228-5. These PPCs 228 provide fine-grained protection. PPCs 228 may also include a second type that is configured to protect memories. The second type of PPC 228 provides memory protection and isolation. Examples of such PPCs 228 include, but are not limited to 228-4 and 228-6.

SMID circuits 226 and PPCs 228 are configured by PMC 210. For example, one of processors 212 is capable of writing to the configuration registers in each SMID circuit 226 and each of PPCs 228 used by a given user design (e.g., based on a device image loaded into architecture 200). PMC 210, for example, assigns the SMIDs to the various circuit components of architecture 200 and configures SMID circuits 226 accordingly. The processor 212 further writes the list of allowed SMIDs and/or the permitted addresses and/or address ranges that each SMID is permitted to access into the configuration registers of PPCs 228. These operations, at least in part, are capable of creating two or more subsystems (e.g., partitions) that are isolated from one another.

For purposes of illustration, once programmed, PPC 228-1 is capable of allowing only authorized transactions from authorized master circuits to access PMC slaves 230. PPC 228-2 is capable of allowing only authorized transactions from authorized master circuits to access NPI 224. PPC 228-3 is capable of allowing only authorized transactions from authorized master circuits to access RPU slaves 232. PPC 228-4 is capable of allowing only authorized transactions from authorized master circuits to access OCM 222. PPC 228-5 is capable of allowing only authorized transactions from authorized master circuits to access APU slaves 234. PPC 228-6 is capable of allowing only authorized transactions from authorized master circuits to access memory controller 214.

In the example of FIG. 2, the particular location of SMID circuits 226 and PPCs 228 is shown for purposes of illustration. SMID circuits 226 and PPCs 228 may be implemented within circuit blocks as part of an interface, within the signal path between circuit blocks, or the like. SMID circuits 226 and PPCs 228 may be implemented in different physical locations that provide logical equivalency. For example, a plurality of blocks may have an aggregated intermediary that attaches to a global pathway such as NoC 208. In that case, the aggregated intermediary may include the SMID circuit 226 and/or the PPC 228 as the case may be rather than each of the individual circuit blocks that aggregates through the intermediary. This may be true for both ingress and egress points in NoC 208.

In the example of FIG. 2, local interconnects 238 may represent one physical circuit block that is capable of merging multiple logical functions. In another example, NoC 208 may be implemented to include one or more SMID attach points. In other words, SMID circuits 226 (e.g., 226-8 and 226-9) may be implemented in NoC 208 as opposed to within PL 204 and/or DPE array 202. SMID circuits 226 may be implemented in NoC 208 at ingress points, at egress points, or at a combination of ingress and egress points.

In the example of FIG. 2, the various connections to local interconnect 238 enter and exit NoC 208 by way of one gateway. Each port of NoC 208 is capable of receiving transactions from one logical source or from a plurality of logical sources. Similarly, each port of NoC 208 is capable of receiving transactions from one physical source or from a plurality of physical sources. A physical source may be a circuit block in a particular subsystem, while a different physical source is a different circuit block in a different subsystem.

For example, PMC 210, RPU 220, and APU 218 each have an SMID circuit 226. Each of PMC 210, RPU 220, and APU 218 is capable of initiating transactions with the unique SMID assigned thereto based on the configuration performed by PMC 210. The transactions flow through to NoC 208 with their respective SMIDs to their destinations. Similarly, transactions from soft masters in PL 204 or master circuits in DPE array 202 each have the SMID inserted by SMID circuit 226-6 or SMID circuit 226-7, as the case may be. The transactions from PL 204 and DPE array 202 carry the SMIDs through to the destinations.

As an illustrative example, consider the case where a soft master implemented in PL 204 initiates transactions A, B, and C. Each of transactions A, B, and C carries the SMID assigned by SMID circuit 226-6 (or SMID circuit 226-8 if implemented in NoC 208). If transaction A is directed to memory controller 214, NoC 208 functions as both the ingress and egress pathway. PPC 228-6 is capable of checking that the soft master in PL 204 has the right to access memory controller 214 (e.g., based on SMID) and has the right to access the particular address(es) of memory specified by the transaction. PPC 228-6 is capable of rejecting transaction A when the soft master originating transaction A does not have adequate rights.

Transaction B may be directed to a PMC slave 230, while transaction C is directed to an RPU slave 232. For purposes of illustration, PMC slaves 230 are shown separately from PMC 210, but may represent particular circuit blocks included within PMC 210 that may be available for use by other master circuits including soft masters. Similarly, RPU slaves 232 and APU slaves 234, while shown separately, may be included within PS 206 and used by other master circuits including soft masters.

In the case of transaction B, PPC 228-1 checks whether the soft master originating transaction B (based on the SMID) is permitted to access the particular PMC slave 230 specified by the transaction. In the case of transaction C, PPC 228-3 checks whether the soft master originating transaction C (based on the SMID) is permitted to access the particular RPU slave 232 specified by the transaction. Each PPC 228-1 and PPC 228-3 permits the respective transaction or rejects the respective transaction based on the SMID and the particular target (e.g., particular PMC slave 230 or particular RPU slave 232) of the transaction. Thus, the logical functioning of the SMID attachment and the egress checking (e.g., as performed by PPCs 228) may be physically distributed within architecture 200.

In another example, an I/O device 236 may be a controller for an external flash device from which firmware is loaded into a first PMC slave 230. In this example, PMC slaves 230 may be memories in which the firmware is stored or registers for programming or configuring other blocks in architecture 200 such as a register set for configuring PL 204 and/or DPE array 202. The firmware may be program code that is to be executed by one of processors 212 in PMC 210. In this example, the various gateways, e.g., PPCs 228 and SMID circuits 226 have been configured by PMC 210 to only allow the firmware to be loaded into one particular PMC slave 230. Accordingly, I/O device 236 is only permitted to write the contents of the image file to the designated, e.g., the first, PMC slave 230 as regulated by PPC 228-1. I/O device 236 is not permitted to read or write to other PMC slaves 230.

Continuing with the example, a first of processors 212 is authorized to load the firmware. For example, PPC 228-1 may be configured to permit, based on the SMID corresponding to SMID circuit 226-1, PMC 210 to read the PMC slave 230 to which the firmware was stored by the I/O device 236 (which only had write access). The first of processors 212 is only able to read the firmware and decrypt the firmware into a second PMC slave 230, e.g., a working memory for the first of processors 212. A second of processors 212 may then use the decrypted firmware stored in the second PMC slave 230 to program other configuration registers, e.g., by writing to a third PMC slave 230. The third PMC slave 230 may be configuration registers for PL 204 or configuration registers for other circuit blocks.

Figure 3:
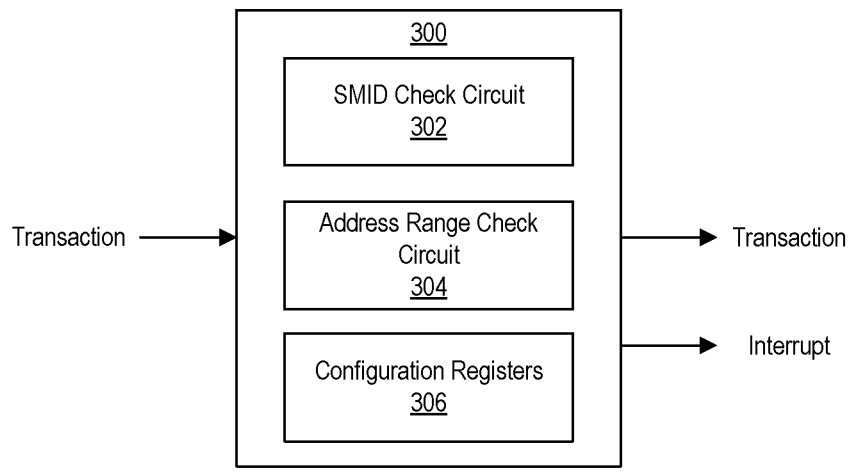
FIG. 3 illustrates an example architecture for the programmable protection circuits of FIG. 2.

FIG. 3 illustrates an example architecture 300 for a PPC 228. Architecture 300 includes an SMID check circuit 302, an address range check circuit 304, and configuration registers 306.

SMID check circuit 302 is capable of checking the SMID of a received transaction. SMID check circuit 302 determines the SMID within the received transaction and compares the SMID with a list of allowed SMIDs specified in configuration registers 306. Address range check circuit 304 determines the particular address(es) that are to be accessed in the destination as specified by the transaction. Address range check circuit 304 checks whether the address(es) specified in the received transaction are within an allowed set or range of addresses for the SMID of the transaction per the configuration registers 306.

Architecture 300 is capable of disallowing (e.g., rejecting) any transaction that does not meet the checks performed by SMID check circuit 302 and address range check circuit 304. Architecture 300 is further capable of generating an interrupt signal in response to determining that a received transaction is rejected based on the checks performed by SMID check circuit 302 and/or address range check circuit 304.

Figure 4:
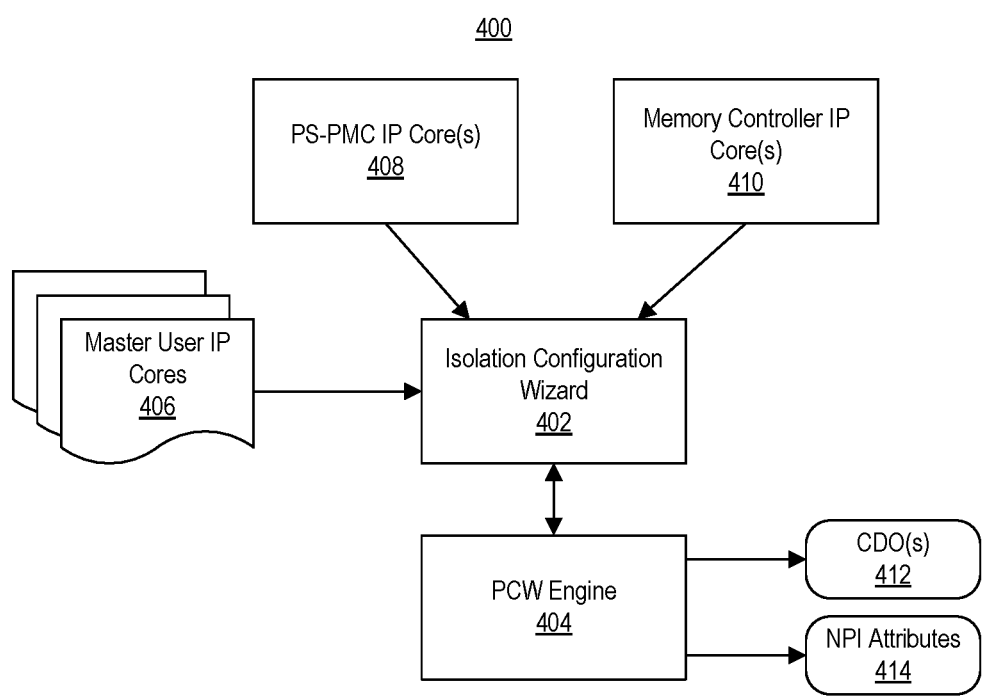
FIG. 4 illustrates an example software architecture for creating subsystems for a design for implementation within a programmable IC.

FIG. 4 illustrates an example software architecture 400 for creating subsystems for a design for implementation within a programmable IC as described in connection with FIGS. 1-3. In the example of FIG. 4, an isolation configuration wizard 402 is shown and is capable of interacting with other Intellectual Property (IP) cores (to be differentiated from cores in DPE array 202). For purposes of illustration, isolation configuration wizard 402 may be implemented within or as part of an EDA system such as one in which users can instantiate and interconnect IP cores, whether user-created or pre-defined from a catalog, to create a user design. Isolation configuration wizard 402 may be implemented as an application that executes in cooperation with the EDA system, as a module of the EDA system, as a plug-in that executes in conjunction with the EDA system, or the like.

As defined herein, the term "IP core" means a pre-designed and reusable unit of logic, cell, or chip layout design in the field of electronic circuit design. An IP core, sometimes referred to as an "Intellectual Property" or "IP," is expressed as a data structure specifying a description of hardware that performs a particular function. An IP core may be expressed using hardware description language file(s), as a netlist, as a bitstream that programs a programmable IC, or the like. An IP core may be used as a building block within circuit designs adapted for implementation within an application-specific integrated circuit (ASIC), a programmable IC (e.g., a Field Programmable Gate Array (FPGA)), system-on-chips (SoCs), and/or other type of IC including heterogeneous ICs.

In the example of FIG. 4, isolation configuration wizard 402 is capable of interacting with one or more master user IP cores 406, one or more PS and/or PMC IP cores 408, and one or more memory controller IP cores 410. Master user IP cores 406, for example, represent IP cores that may be implemented in PL 204. PS and/or PMC IP cores 408 represent IP cores that may be used to configure PS 206 and/or PMC 210. Memory controller IP cores 410 may be used to configure memory controller 214. Isolation configuration wizard 402 may communicate with the IP cores shown and/or other IP cores not illustrated in FIG. 4. Examples of such other IP cores may include IP cores for other hardwired circuit blocks such as I/O controllers that may be included in the programmable IC and used by the user circuit design.

Isolation configuration wizard 402 is communicatively linked to a Processor Configuration Wizard (PCW) engine 404. PCW engine 404 is capable of receiving user data defining different subsystems to be created for a given user design and generate programming data that may be used to program the programmable IC to create the subsystems therein. PCW engine 404 may also generate data that may be passed to one or more other downstream development tools for use in continued development of other aspects of the user design. An example of a downstream tool is a software development environment used to develop a software domain for use and/or execution by one of the subsystems created using isolation configuration wizard 402.

In the example of FIG. 4, PCW engine 404 is capable of generating and outputting one or more configuration data objects (CDO(s)) 412. CDOs 412 may be used to program one or more programmable resources of the programmable IC such as DPE array 202, PL 204, PS 206, or NoC 208. PCW engine 404 is further capable of generating NPI attributes 414 that may be used to program NPI 224.

In one aspect, each master circuit may have multiple SMIDs. In that case, the SMID(s) or SMID range for a master circuit may be shared with isolation configuration wizard 402 in the form of an SMID and Mask ID pair. The SMID and Mask ID pair defines the SMID range for each master circuit. For example, $SMID_n \in SMID$ range of a master circuit "m" if $SMID_n \text{ \&\& } MaskID_m == SMID_m \text{ \&\& } MaskID_m$, wherein $SMID_n$ is the nth SMID from all 10 bit SMIDs AND $MaskID_m$, and $SMID_m$ is the Mask and SMID pair of master circuit m. In this example, the number of SMIDs that may be assigned to a master circuit will be in the $2^n$ number. In this illustration, 10-bit values of SMIDs are used for purposes of illustration and not limitation.

Thus, the expression SMIDn && MaskIDm==SMIDm && MaskIDm is used to share the set of SMIDs for a particular master. As an illustrative and nonlimiting example, consider the case where a particular master circuit, a DMA, is assigned SMIDs [0b0000, 0b0001, 0b0010, 0b0011]. The following SMID and MaskID pair may be used to extract all assigned SMIDs for the DMA:

SMIDm=0b00xx
MaskIDm=0b0011

Referring to the above, m=DMA and xx=don't care bits. In this case, the expression, SMIDn&&MaskIDm==SMIDm&&MaskIDm will return true only for SMIDn=[0b0000, 0b0001, 0b0010, 0b0011].

In the example of FIG. 4, isolation configuration wizard 402 is capable of communicating with, e.g., querying, the IP cores shown to determine or extract the SMID for each IP core. In one aspect, each IP core that is a master may include or specify the SMID(s) for that IP core. Isolation configuration wizard 402 is capable of querying the IP cores to extract the SMID of each such IP core. The determination of SMIDs for each IP core may be performed as part of generating subsystems as described herein in greater detail below.

Figure 5:
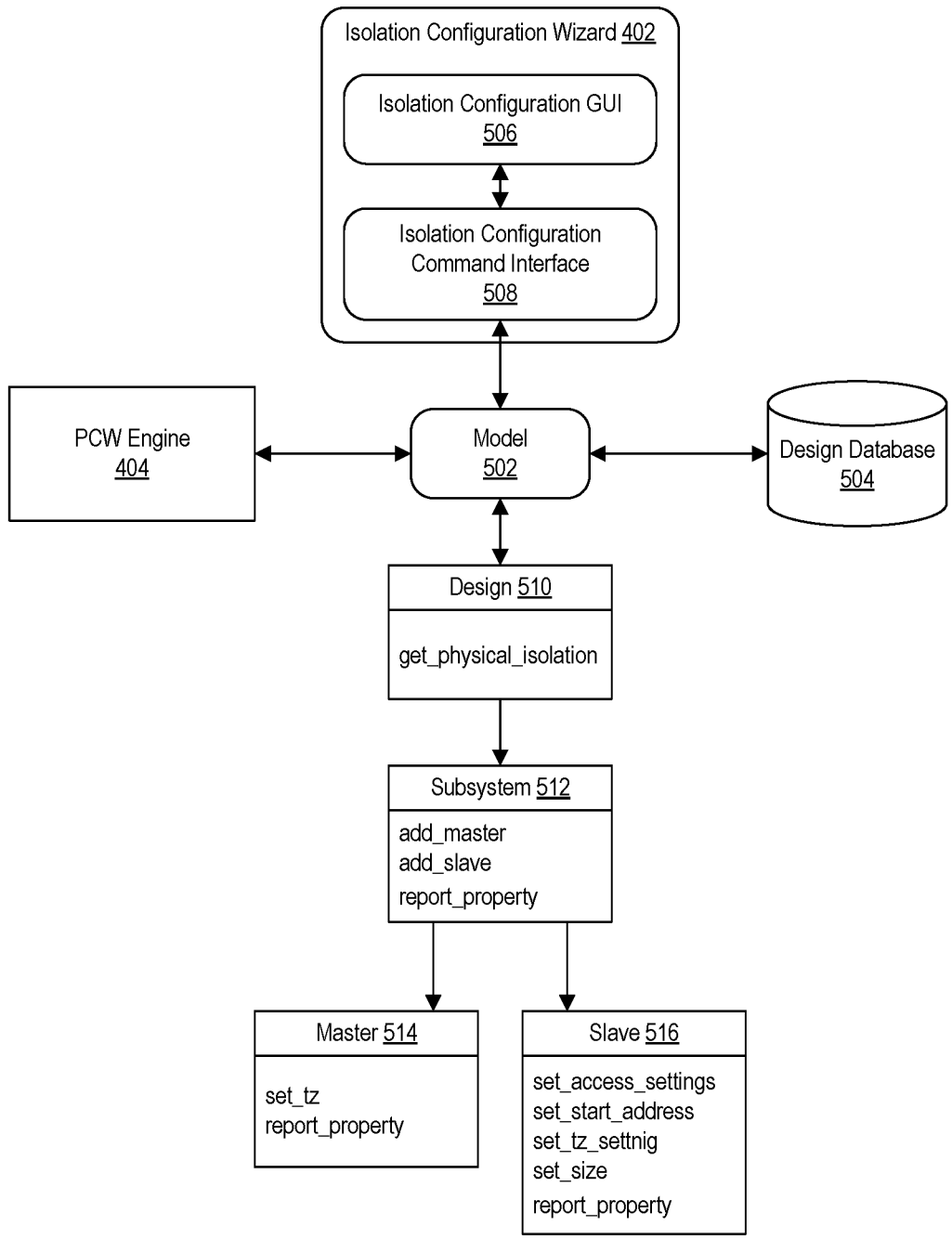
FIG. 5 illustrates another example software architecture for creating subsystems for a design for implementation within a programmable IC.

FIG. 5 illustrates another example software architecture 500 for creating subsystems for a design for implementation within a programmable IC as described in connection with FIGS. 1-4. In the example of FIG. 5, isolation configuration wizard 402 is communicatively linked to a model 502. PCW engine 404 is communicatively linked to model 502. Model 502 is communicatively linked to a design database 504.

In the example of FIG. 5, isolation configuration wizard 402 may include an isolation configuration graphical user interface (GUI) 506 and an isolation configuration command interface 508. A user can access isolation configuration GUI 506 and/or isolation configuration command interface 508 to create one or more subsystems for a user design. Each subsystem within the user design may include one or more master circuits and one or more slave circuits. Using either one or both of isolation configuration GUI 506 and/or isolation configuration command interface 508, a user can define subsystems and connectivity between master circuits and slave circuits within the user design for each subsystem.

In general, isolation configuration GUI 506 and/or isolation configuration command interface 508 is capable of creating model 502 and continuing to build model 502 in response to received user inputs specifying subsystem data. In one aspect, isolation configuration GUI 506, in response to received user input(s), is capable invoking isolation configuration command interface 508 to construct model 502.

Isolation configuration command interface 508 may be implemented as a command line interface. In one aspect, communication command line interface 508 is implemented as a Tcl interface. Isolation configuration command interface 508 executes commands. The commands may be entered by the user directly on the command line or specified by user inputs received via isolation configuration GUI 506. Table 1 below illustrates example commands that may be executed by communication command line interface 508 to operate on model 502.

TABLE 1

| Command | Function |
| --- | --- |
| add_subsystem -name -design | Creates a subsystem with the name "-name" in the model corresponding to the user design "-design." |
| add_master -name -tz -subsystem | Adds a master circuit with the name "-name" and sets the trust zone parameter for the master circuit to "-tz" for the subsystem with the name "-subsystem." The master circuit may be a soft master. |
| add_slave -sa -size -access -tz -subsystem | Adds a slave circuit with the start address of "-sa" and a size of "-size" and the type of access "-access" with a trust zone setting of "-tz" for the subsystem named "-subsystem." |
| report_subsystem -design | Reports a list of all subsystems in the user design called "-design." |
| list_masters -design | Shows a list of all master circuits in the user design called "-design." Any master circuit from this list can be added in an existing subsystems. |

Model 502 is a data model, e.g., a data structure, that specifies the system elements included in the user's design as instantiated using isolation configuration wizard 402. For example, model 502, when constructed, may specify subsystems in the user design, each master circuit and slave circuit in each subsystem, and physical connections between master and slave circuits in the user design. The example commands illustrated in Table 1 may be executed by communication command line interface 508 to perform operations such as retrieving information from the different objects within model 502, creating subsystems, adding master circuits and/or slave circuits, changing properties of subsystems, master circuits, and/or slave circuits, and the like.

A hierarchy of the user design represented by model 502 and illustrated as design 510 is shown. Examples of objects of design 510 are shown. For purposes of description, the objects defined by model 502 are referred to by the names shown in FIG. 5. It will be appreciated, however, that "subsystem 512" is an object representing a subsystem 512 having the properties listed in the object shown. Accordingly, referring to FIG. 5, design 510 includes a subsystem 512. Subsystem 512 may be instantiated through execution of the command "add_subsystem-name-design." Subsystem 512 includes a master circuit, e.g., master 514, and a slave circuit, e.g., slave 516, that may be connected to the master circuit. Each of the objects shown may have one or more properties. Example properties for each object are illustrated in FIG. 5.

PCW engine 404 is capable of operating on model 502 and generating data that may be stored in design database 504. In one aspect, design database is used for subsystem persistence. Design database 504 is capable of storing design information specifying the subsystem topology. The term "subsystem topology," as define herein means the particular IP cores (e.g., IPs) that are present or used in the user circuit design and ports and connections between the masters and the slaves of the different subsystems of the user circuit design. Design database 504 may be used to reconstruct a particular project, e.g., the subsystems of model 502. When EDA software, for example, opens the project, the EDA software is capable of reading design database 504 and capturing earlier configured subsystem data from the subsystem topology. The EDA software may show or display such information to the user for reconfiguration. In one aspect, CDOs and DSAs are not part of design database 504, though CDOs and/or DSAs may be output from the tool.

FIG. 6 illustrates an example implementation of isolation configuration GUI 506 of FIG. 5. In the example of FIG. 6, isolation configuration GUI 506 specifies two different subsystems. The first subsystem is the APU subsystem. The second subsystem is the RPU subsystem. For each subsystem shown, a user is able to work through isolation configuration GUI 506 to specify the particular master circuits and slave circuits in each respective subsystem and the properties shown for each circuit.

In general, the APU subsystem has APU 218 as a master circuit. The APU subsystem has a DDR memory as a slave and a Controller Area Network (CAN) peripheral as a slave. The portion of DDR memory allocated to the APU subsystems has a starting address of 0x0, a size of 1 MB, is nonsecure, provides read and write access, has an ending address of 0xFFFFF, and a type of "DDR." The trust zone (TZ) setting indicates whether the segment of memory is designated as secure or nonsecure. Applications executed by APU 218 are designated as secure or nonsecure. APU 218, when executing a secure application is executing in a secure mode. APU 218, when executing a nonsecure application, is executing in a nonsecure mode. When APU 218 is executing in the secure mode, APU 218 is capable of accessing both secure and nonsecure regions of DDR allocated to APU 218. When APU 218 is executing in nonsecure mode, APU 218 is capable of accessing only nonsecure regions of DDR allocated to APU 218. The type indicates the particular power domain of the heterogeneous IC in which the master and/or slave exists. The heterogeneous IC may have a plurality of power domains, where each may be independently powered on and off under control of PMC 210. In the example of FIG. 6, the heterogeneous IC may include more than one CAN. The CAN allocated to the APU subsystem is called "CAN1." The CAN is an example of a hardwired circuit block. CAN1 has a starting address of 0xFF0700000, a size of 64 KB, is nonsecure, provides read and write access, has an ending address of 0xFF07FFFF, and a type of low power domain (LPD).

The RPU subsystem has RPU 220 as a master circuit. The RPU subsystem has a DDR memory as a slave and a UART as a slave. The portion of DDR memory allocated to the APU subsystems has a starting address of 0x100000, a size of 1 MB, is nonsecure, provides read and write access, has an ending address of 0x1FFFFF, and a type of DDR. UART0 has a starting address of 0xFF000000, a size of 64 KB, is nonsecure, provides read and write access, and has a type of LPD. In the example of FIG. 6, the heterogeneous IC may include more than one UART in that the UART allocated to the RPU subsystems is called "UART0." The UART is an example of a hardwired circuit block.

In the example of FIG. 6, certain properties of hardwired circuit blocks may unchangeable. For example, parameters of the APU and the RPU are not shown as such properties may be set by default and not changeable by the user. In other cases, certain properties may have default settings that may be overridden by the user. These properties, e.g., start address of the peripherals and size, may be indicated with shading.

As discussed with reference to FIG. 5, it should be appreciated that any subsystems that may be specified using isolation configuration GUI 506 may also be specified using communication command line interface 508. In the example of FIG. 6, subsystems may include additional master circuits and/or additional slave circuits. These additional circuits may include soft masters, other master circuits, masters implemented in DPE array 202 and/or any of a variety of slave circuits implemented in DPE array 202, PL 204, or the like.

FIG. 7 illustrates an example method 700 of creating subsystems for a user design. Method 700 may be performed by a system as described in connection with FIGS. 1-6. For purposes of description, the data processing system executing isolation configuration wizard 402 and the PCW engine 404 is referred to as the "system." It should be appreciated, however, that the system may be formed of one or more interconnected data processing systems.

In block 702, the system generates a subsystem topology based on user provided subsystem data. The subsystem data may be obtained from the isolation configuration wizard. In one aspect, the user specified data is be received via the isolation configuration GUI described herein. In another aspect, the user specified data is received via the communication command line interface. The subsystem topology specifies a plurality of subsystems of a user design for implementation in an IC. Each subsystem includes one or more master circuits. Further, the IC may be a heterogeneous IC. In one aspect, the subsystem topology may be specified as a JSON formatted file.

In block 704, the system determines one or more SMIDs for master circuits specified within the different subsystems of the design. In one aspect, the system is capable of querying the IP cores specifying master circuits as defined in block 702. The system queries the IP cores to retrieve one or more SMIDs for each IP core (e.g., for each master circuit of the subsystem topology). As discussed, the master circuits may include soft masters.

In block 706, the system generates programming data for the PPCs of the IC based on the subsystem topology and the SMIDs. The PPCs, when programmed with the programming data, form the plurality of subsystems. Further, the PPCs, once programmed, physically isolate the plurality of subsystems on the IC from one another.

By generating the programming data for the PPCs, the system creates memory isolation in the user design. For example, the programming data for each PPC defines the particular master circuits of each subsystem that are permitted to access the memories and/or peripherals specified as slave circuits for the different subsystems.

Figure 8:
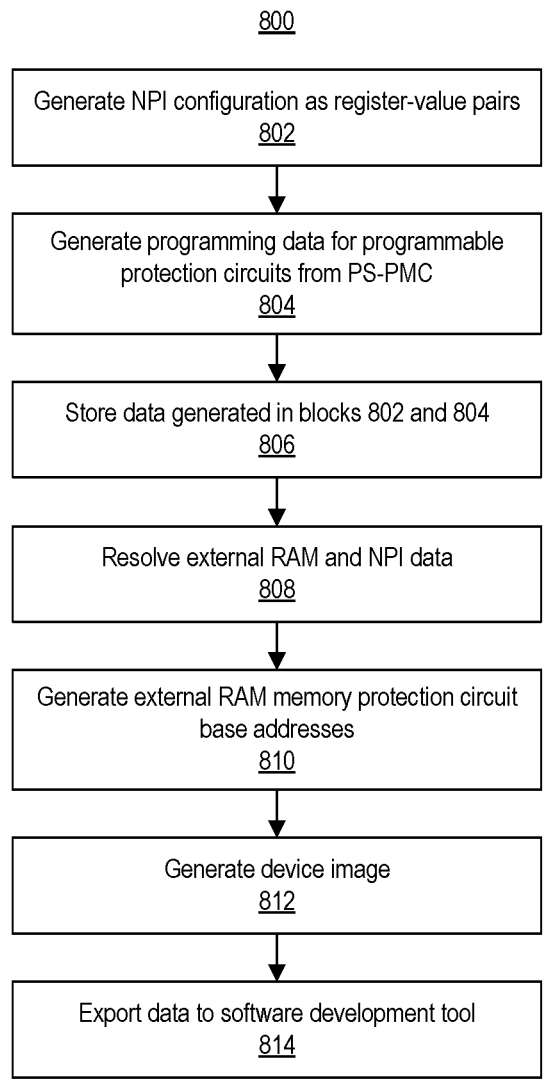
FIG. 8 illustrates another example method of creating subsystems for a user design.

FIG. 8 illustrates another example method 800 of creating subsystems for a user design. Method 800 may be performed by a system as described in connection with FIGS. 1, 4, and 5. For purposes of description, the data processing system executing isolation configuration wizard 402, PCW engine 404, and the EDA software is referred to as the "system." It should be appreciated, however, that the system may be formed of one or more interconnected data processing systems.

For purpose of description, method 800 begins in a state where user provided subsystem data has been obtained defining the subsystems (e.g., block 702 of FIG. 7) and where SMIDs for master circuits have been retrieved from the IP cores (e.g., block 704 of FIG. 7).

In block 802, the system generates an NPI configuration for the PPC(s) protecting off-chip RAM (e.g., volatile memory 134). The NPI configuration may be specified as one more register-value pairs. Each register-value pair specifies the particular register to be programmed, e.g., the name of the register of the NPI, and the value to be programmed into that register. At this stage of the design process, a particular target device (e.g., a particular heterogeneous IC) may not be specified. As such, the register-value pairs do not have any addressing information. The addressing information may be added or resolved at a later point during the design process once a particular target IC is specified. For example, referring to FIG. 2, the system generates NPI configuration for PPC 228-6 protecting external or off-chip RAM.

In block 804, the system generates programming data for PPCs for the PS-PMC. Since the PS and the PMC are hardwired circuit blocks, the addressing for these resources is fixed. Accordingly, the system is capable of generating the configuration data for the PPCs protecting the PMC and for the PPCs protecting the PS. For example, referring to FIG. 2, the system is capable of generating programming data for PPC 228-1 protecting PCM slaves 230, for PPC 228-3 protecting RPU slaves 232, and for PPC 228-5 protecting APU slaves 234.

In block 806, the system is capable of storing the data generated in blocks 802 and 804. In one aspect, the system is capable of storing the NPI configuration generated in block 802 within a container file. An example of a container file in which the NPI configuration may be stored is a DSA file. A container file refers to a file in which a plurality of other files can be included. The container file appears as a single file despite its ability to store a plurality of different files and file types therein. Software tools are capable of extracting particular portions of data (e.g., particular files) from the container. In one aspect, the NPI configuration may be specified as a JSON file included within the DSA.

The system is also capable of storing the programming data for the PPCs for the PS and PMC as a CDO referred to as the "PS-PMC CDO." The PS-PMC CDO includes the instructions that may be executed by the heterogeneous IC, e.g., the PMC, to program the PPCs associated with the PS and the PMC. In this regard, the system may later include the PS-PMC CDO within a device image that may be loaded into the heterogeneous IC for configuration thereof. The device image may include a plurality of CDOs and/or binary files that are used to configure and/or program the different portions of the heterogeneous IC. For example, the PMC is capable of executing the instructions stored in the PS-PMC CDO to program particular ones of the PPCs.

For purposes of discussion, blocks 802 and 804 may be performed by the PCW engine 404 described in connection with FIG. 4. Blocks 806, 808, and 810 may be performed by the EDA software. In general, the EDA software is capable of performing operations to generate the device image used to configure the heterogeneous IC. In one aspect, the EDA software, at this point in the development process, is informed of the particular heterogeneous IC to be used to implement the user design.

In block 808, the system resolves the external RAM and NPI configuration. For example, knowing the particular heterogeneous IC in which the user design is to be implemented, the system is capable of resolving the addresses for the address-value pairs of the NPI configuration. In one aspect, the system writes the resolved NPI configuration, referred to as NPI programming data, to an NPI CDO.

In block 810, the system generates external RAM PPC base addresses. The external RAM PPC base addresses are a list of the base address in external RAM for each subsystem of the user design. The system is capable of including the RAM PPC base addresses and the subsystem topology (e.g., the list of subsystems including each master circuit and slave circuit in each respective subsystem) in another DSA.

In block 812, the system is capable of generating a device image that includes the NPI CDO and the PS-PMC CDO. In block 814, the system is capable of exporting data to a software development tool (e.g., another EDA application). The system may export the subsystem topology that specifies the subsystems, the master circuits and slave circuits and connectivity for each subsystem, including the RAM PPC base addresses. For example, the system is capable of exporting the RAM PPC base addresses, the PS-PMC CDO, and the NPI programming data to the software development tools. In one aspect, the data exported in block 812 is exported as another DSA file.

Figure 9:
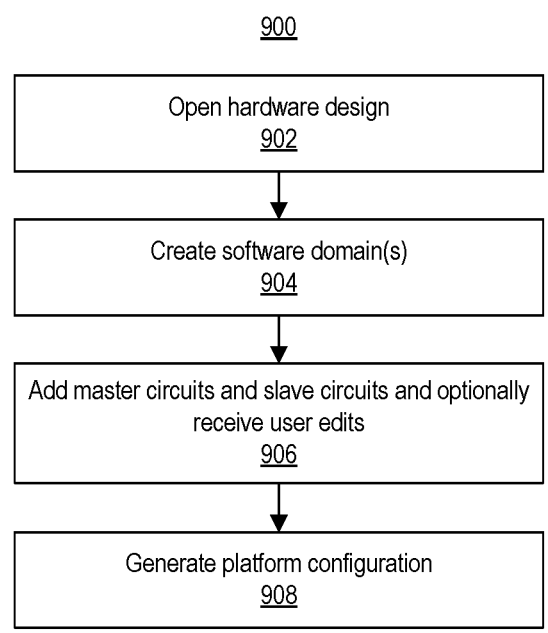
FIG. 9 illustrates an example method of creating software domains for the user design.

FIG. 9 illustrates an example method 900 of creating software domains for the user design. Method 900 illustrates a process that may be performed by the software development tool using data exported from the processes described in connection with FIG. 7 and/or FIG. 8. In general, the system, in executing the software development tool, is capable of developing one or more software domains that may execute in one or more of the created subsystems.

In block 902, the system opens the hardware design, which corresponds to the data exported in block 814. In block 904, the system is capable of creating (e.g., defining) a software domain for each subsystem that executes software. For example, a software domain may be built for each of the APU and RPU subsystems. The software domain may specify a particular operating system to be used or executed by the processor in the software domain and is configured based on the particular memories and peripherals available in the subsystem for which the software domain is created.

In block 906, the master circuits and slave circuits are added to the software domains. During this process, the user may edit the software domains by adding additional master circuits and/or slave circuits, removing master circuits and/or slave circuits (including those initially created as described in connection with FIGS. 7 and/or 8), and/or editing existing master circuits and/or slave circuits. The hardware information generated in FIGS. 7 and 8, for example, may be made available within the software development tool for editing as described thereby allowing users (e.g., software developers) to alter subsystems as needed to suit the needs of the software domain(s) being created.

Visibility of physical components for the software domain may be restricted for each master circuit based on the isolation settings imported from the DSA. In one aspect, any updated isolation settings may be stored using Tcl commands. The master circuits, including soft masters, may be exposed for configuration by the user. The system is capable of deriving a memory map of the master circuits from the DSA. The system further may expose available memory segments for configuration. Any memory segments that are not under any software domain (e.g., not part of a particular subsystem) are open for use by all masters by default.

In block 908, the system is capable of generating a platform configuration. For example, the system is capable of generating software isolation data for each of the subsystems that has a software domain. The software isolation data may include a device tree and a linker script. The device tree is a file, e.g., a data structure, that describes the hardware components of a particular subsystem so that the operating system of the software domain of the subsystem (e.g., the kernel) can use and manage those components. The linker script is a file that includes linker directives that tell a linker where the available memory is for the software domain and how that memory may be used. The linker script reflects, e.g., specifies, the memory resources and memory map of the particular processor of the software domain (e.g., the APU or the RPU in this example).

The system is also capable of outputting physical isolation data indicating any changes to the subsystems that may have been specified by the user through the software development tool. For any changes specified, the software development tool is capable of passing the user specified edits to the subsystem(s) to the PCW engine to adjust any programming data, adjust any address resolutions, and export an updated device image.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one aspect, a method includes generating, using computer hardware, a subsystem topology based on user provided subsystem data. The subsystem topology specifies a plurality of subsystems of a user design for implementation in an IC where each subsystem includes a master circuit. The method includes determining, using the computer hardware, a system management identifier for each master circuit of the subsystem topology and automatically generating, using the computer hardware, programming data for programmable protection circuits of the IC based on the subsystem topology and system management identifiers. The programmable protection circuits, when programmed with the programming data, are capable of forming the plurality of subsystems and physically isolating the plurality of subsystems on the IC from one another.

In another aspect, the IC includes programmable logic and at least one of the master circuits is implemented in the programmable logic of the IC.

In another aspect, the programmable protection circuits protect access to a random access memory used by at least one of the master circuits.

In another aspect, the subsystem topology further specifies, for each subsystem, a slave circuit, and wherein the programming data defines, for each subsystem, the system management identifiers permitted to access each slave circuit.

In another aspect, the method includes providing the subsystem topology to a software development tool, generating a software domain for a selected subsystem of the plurality of subsystems, and generating a platform configuration for the software domain.

In another aspect, the platform configuration includes a device tree and a linker script for the selected subsystem.

In another aspect, the method includes generating Network-on-Chip Peripheral Interface programming data including address-value pairs.

In another aspect, the method includes resolving the address-value pairs to particular addresses.

In another aspect, a system includes a processor configured to initiate operations. The operations include generating a subsystem topology based on user provided subsystem data. The subsystem topology specifies a plurality of subsystems of a user design for implementation in an IC where each subsystem includes a master circuit. The operations include determining a system management identifier for each master circuit of the subsystem topology and automatically generating programming data for programmable protection circuits of the IC based on the subsystem topology and system management identifiers. The programmable protection circuits, when programmed with the programming data, are capable of forming the plurality of subsystems and physically isolating the plurality of subsystems on the IC from one another.

In another aspect, the IC includes programmable logic and at least one of the master circuits is implemented in the programmable logic of IC.

In another aspect, the programmable protection circuits protect access to a random access memory used by at least one of the master circuits.

In another aspect, the subsystem topology further specifies, for each subsystem, a slave circuit, and wherein the programming data defines, for each subsystem, the system management identifiers permitted to access each slave circuit.

In another aspect, the processor is configured to initiate operations including providing the subsystem topology to a software development tool, generating a software domain for a selected subsystem of the plurality of subsystems, and generating a platform configuration for the software domain.

In another aspect, the platform configuration includes a device tree and a linker script for the selected subsystem.

In another aspect, the processor is configured to initiate operations including generating Network-on-Chip Peripheral Interface programming data including address-value pairs.

In another aspect, the processor is configured to initiate operations including resolving the address-value pairs to particular addresses.

In another aspect, a computer program product includes a computer readable storage medium having program code stored thereon. The program code is executable by a processor to perform operations. The operations include generating a subsystem topology based on user provided subsystem data. The subsystem topology specifies a plurality of subsystems of a user design for implementation in an IC where each subsystem includes a master circuit. The operations include determining a system management identifier for each master circuit of the subsystem topology and automatically generating programming data for programmable protection circuits of the IC based on the subsystem topology and system management identifiers. The programmable protection circuits, when programmed with the programming data, are capable of forming the plurality of subsystems and physically isolating the plurality of subsystems on the IC from one another.

In another aspect, the IC includes programmable logic and at least one of the master circuits is implemented in the programmable logic of the IC.

In another aspect, the programmable protection circuits protect access to a random access memory used by at least one of the master circuits.

In another aspect, the subsystem topology further specifies, for each subsystem, a slave circuit, and wherein the programming data defines, for each subsystem, the system management identifiers permitted to access each slave circuit.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
   generating, using computer hardware, a subsystem topology based on user provided subsystem data, wherein the subsystem topology specifies a plurality of subsystems of a user design for implementation in an integrated circuit where each subsystem includes a master circuit;
   determining, using the computer hardware, a system management identifier for each master circuit of the subsystem topology;
   automatically generating, using the computer hardware, programming data for programmable protection circuits of the integrated circuit based on the subsystem topology and system management identifiers; and
   wherein the programmable protection circuits, when programmed with the programming data, form the plurality of subsystems and physically isolate the plurality of subsystems on the integrated circuit from one another.

2. The method of claim 1, wherein the integrated circuit includes programmable logic and at least one of the master circuits is implemented in the programmable logic of the integrated circuit.

3. The method of claim 1, wherein the programmable protection circuits protect access to a random access memory used by at least one of the master circuits.

4. The method of claim 1, wherein the subsystem topology further specifies, for each subsystem, a slave circuit, and wherein the programming data defines, for each subsystem, the system management identifiers permitted to access each slave circuit.

5. The method of claim 1, further comprising:
   providing the subsystem topology to a software development tool;
   generating a software domain for a selected subsystem of the plurality of subsystems; and
   generating a platform configuration for the software domain.

6. The method of claim 5, wherein the platform configuration includes a device tree and a linker script for the selected subsystem.

7. The method of claim 1, further comprising:
   generating Network-on-Chip Peripheral Interface programming data including address-value pairs.

8. The method of claim 7, further comprising:
   resolving the address-value pairs to particular addresses.

9. A system, comprising:
   a processor configured to initiate operations including:
      generating a subsystem topology based on user provided subsystem data, wherein the subsystem topology specifies a plurality of subsystems of a user design for implementation in an integrated circuit where each subsystem includes a master circuit;
      determining a system management identifier for each master circuit of the subsystem topology;
      automatically generating programming data for programmable protection circuits of the integrated circuit based on the subsystem topology and system management identifiers; and wherein the programmable protection circuits, when programmed with the programming data, form the plurality of subsystems and physically isolate the plurality of subsystems on the integrated circuit from one another.

10. The system of claim 9, wherein the integrated circuit includes programmable logic and at least one of the master circuits is implemented in the programmable logic of the integrated circuit.

11. The system of claim 9, wherein the programmable protection circuits protect access to a random access memory used by at least one of the master circuits.

12. The system of claim 9, wherein the subsystem topology further specifies, for each subsystem, a slave circuit, and wherein the programming data defines, for each subsystem, the system management identifiers permitted to access each slave circuit.

13. The system of claim 9, wherein the processor is configured to initiate operations further comprising:
providing the subsystem topology to a software development tool;
generating a software domain for a selected subsystem of the plurality of subsystems; and
generating a platform configuration for the software domain.

14. The system of claim 13, wherein the platform configuration includes a device tree and a linker script for the selected subsystem.

15. The system of claim 9, wherein the processor is configured to initiate operations further comprising:
generating Network-on-Chip Peripheral Interface programming data including address-value pairs.

16. The system of claim 15, wherein the processor is configured to initiate operations further comprising: resolving the address-value pairs to particular addresses.

17. A computer program product, comprising:
a computer readable storage medium having program code stored thereon, wherein the program code is executable by computer hardware to initiate operations including:
generating a subsystem topology based on user provided subsystem data, wherein the subsystem topology specifies a plurality of subsystems of a user design for implementation in an integrated circuit where each subsystem includes a master circuit;
determining a system management identifier for each master circuit of the subsystem topology;
automatically generating programming data for programmable protection circuits of the integrated circuit based on the subsystem topology and system management identifiers; and
wherein the programmable protection circuits, when programmed with the programming data, form the plurality of subsystems and physically isolate the plurality of subsystems on the integrated circuit from one another.

18. The computer program product of claim 17, wherein the integrated circuit includes programmable logic and at least one of the master circuits is implemented in the programmable logic of the integrated circuit.

19. The computer program product of claim 17, wherein the programmable protection circuits protect access to a random access memory used by at least one of the master circuits.

20. The computer program product of claim 17, wherein the subsystem topology further specifies, for each subsystem, a slave circuit, and wherein the programming data defines, for each subsystem, the system management identifiers permitted to access each slave circuit.

* * * * *